Sept. 3, 1935.  F. STRATTNER  2,013,393
ELECTRIC METER TESTING DEVICE
Filed Feb. 4, 1932  2 Sheets-Sheet 1

INVENTOR
Frederick Strattner
BY
Augustus B. Stoughton
ATTORNEY.

WITNESS:
Robt R. Mitchel.

Sept. 3, 1935.   F. STRATTNER   2,013,393
ELECTRIC METER TESTING DEVICE
Filed Feb. 4, 1932   2 Sheets—Sheet 2
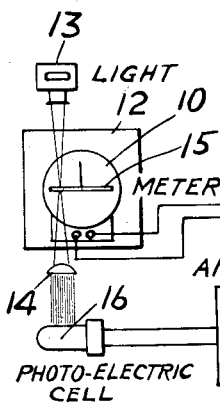
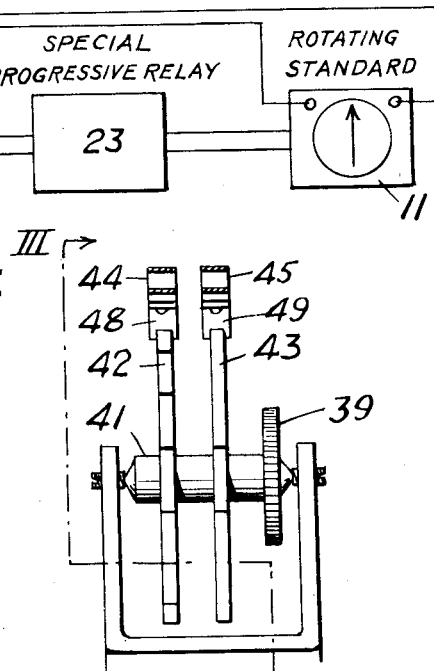
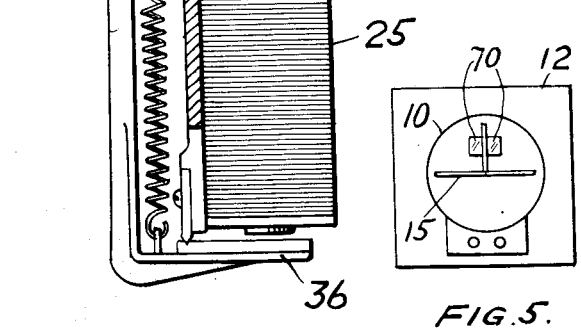
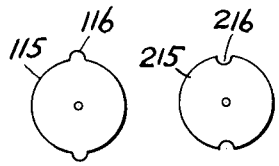
FIG. 2.
FIG. 3.
FIG. 4.
FIG. 5.
FIG. 6.   FIG. 7.
WITNESS:
Rob't P. Mitchell
INVENTOR
Frederick Strattner
BY
Augustus B. Stoughton
ATTORNEY.

Patented Sept. 3, 1935

2,013,393

UNITED STATES PATENT OFFICE 2,013,393

ELECTRIC METER TESTING DEVICE

Frederick Strattner, Manoa, Pa.

Application February 4, 1932, Serial No. 590,906

1 Claim. (Cl. 175—183)

The subject of my invention is a device for comparing electric meters, such as the watthour meters used on the premises of customers of electric power companies, with precision watthour meters. The precision watthour meters are generally referred to as "rotating standard test meters" and are carefully calibrated to known accuracies by means of standards, these standards being under State supervision. The method of making the test is to connect a rotating standard in circuit with the meter undergoing test and after a number of revolutions of the disk of the meter under test have been made, comparisons are made of the relative speeds of the "standard" and meter undergoing test. The accuracy is thus readily obtained.

My device consists of the combination of a lamp with a lens system giving a concentrated beam of light, a meter undergoing test whose disk is exposed to said beam of light, a photo-electric cell, a vacuum tube amplifier, a relay, a progressive electrically operated switch and a standard meter connected in circuit with said meter under test.

Advantage is taken of the anti-creep arrangement which is an integral part of all modern watthour meters and consists of small holes or openings in the disk or rotating member of the meter. The beam of light from the lamp is made to pass through these openings during a fractional part of the revolution of the disk.

This light causes a photo-electric cell to pass a minute current of electricity through it. This current is then amplified by means of electron tubes to a value suitable for operating a relay.

An electrically operated progressive switch is controlled by means of this relay in such a manner that the potential circuit of the "rotating standard" is controlled at the proper time during the test.

In order to eliminate all personal error, provisions have been made whereby the first half revolution of the disk is ignored by the machine after it has been placed in operation by the one making the test. This prevents all possibility of error due to improper impulses being given at the start of the test, such as might occur if a hole in the disk were directly in the path of the beam of light when the machine was started.

For a further description of my invention reference may be had to the annexed drawings and specification at the end whereof my invention will be specifically pointed out and claimed.

In the drawings,

Figure 2 is a schematic diagram showing the mechanical elements of my device.

Figure 3 is a detail view in cross section on line III—III of Figure 4.

Figure 4 is a view at right angles of parts shown in Figure 3 with parts in cross section.

Figure 5 is a diagram of a modified form of meter.

Figure 6 is a plan view of a modified meter disk.

Figure 7 is a plan view of another modified meter disk.

Figure 1:
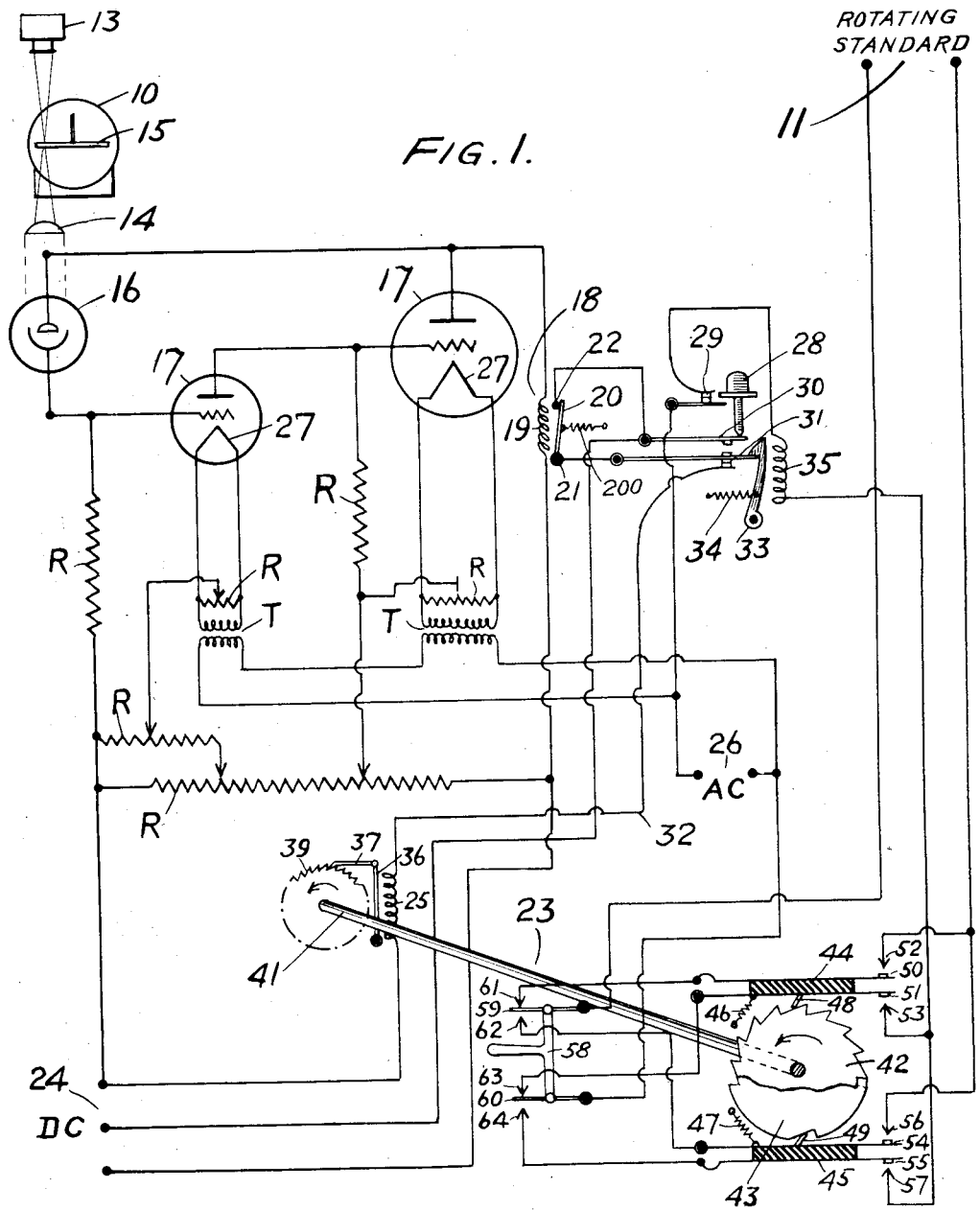
Figure 1 is a diagram showing parts of my device and the electric connections therefor.

In that embodiment of my invention chosen for illustration in the drawings, my device is shown as consisting of a meter 10 which is the meter to be tested. Connected in circuit therewith is a precision meter generally referred to as a "rotating standard test meter" which has been carefully calibrated to known accuracies by means of standards. Adjacent meter 10 is provided a test rack 12 which may conveniently have contacts thereon which automatically connect the meter 10 in circuit with the standard meter 11, when the meter 10 is placed on the test rack.

Adjacent meter 10 is provided a light 13 having a cooperating lens system 14 adapted to give a narrow beam of light. The meter 10 is so placed relative to the light 13 and the lens system 14 that the beam of light intersects the plane of the disk 15 or other rotating part of the meter 10. In operative relation to lens system 14 there is provided a photo-electric cell 16 so arranged that the light from light 13 falls on cell 16 when it passes through a hole in disk 15. Electrically connected to cell 16 is an amplifier which consists of electron tubes 17 which have suitable resistances R and transformers T connected thereto and to a source of current in any convenient amplifying circuit. In the output side of the amplifying circuit there is connected a relay generally indicated at 18 which consists of a coil 19 and a switch blade 20 pivoted at 21 to cooperate with a stationary contact 22. Electrically connected to relay 18 is a special progressive relay generally indicated at 23 which is in turn electrically connected to the standard meter 11.

Figure 1 shows the electric connections of my device somewhat more in detail. As seen in this figure there is provided a source of power 24 which supplies power for the amplifying circuit 17 and the coil 25 which forms a part of progressive relay 23 and to the amplifying circuit containing tubes 17 and coil 19. Source of current 24 may conveniently take the form of a three wire direct current circuit of 220 volts across the outside wires and 110 volts across either outside wire and the center wire. Figure 1 also discloses a source of current 26 for the filaments 27 of vacuum tube 17 and the potential circuit of meter 11. Source 26 may conveniently be 110 volts alternating current.

The starting and stopping of meter 10 and standard meter 11 is conveniently controlled by a manually operable switch consisting of a push button 28 adapted when depressed to open contacts 29 and to close connection between contacts 30 and 31 and to also close contact 31 against contact 32. Upon release of button 28, contact 31 is held closed against contact 32 by a spring pressed latch 33. Latch 33 is pulled open against the stress of spring 34 by coil 35 when coil 35 is energized.

The progressive relay generally indicated at 23 is shown somewhat more in detail in Figures 1, 3 and 4. Relay 23 contains a motor consisting of coil 25 adapted to actuate an armature 36 which in turn actuates a pawl 37 which is pivoted on armature 36 and connected thereto by a spring 38. Pawl 37 drives ratchet 39 which is held against return motion by spring 40. Ratchet 39 drives shaft 41 which may carry two cams 42 and 43 thereon. One of these cams is provided with a number of teeth suitable for testing the meter at light load while the other cam is provided with a number of teeth suitable for testing the meter under full load. Cooperating with cams 42 and 43 respectively are switches 44 and 45 which in the modification shown in Figures 3 and 4 are mounted above the cams so as to be supported thereby and which are shown diagrammatically in Figure 1 as above and below the cams for the sake of clearness. Springs 46 and 47 serve to draw switches 44 and 45 into contact with their cooperating cams 42 and 43. Switches 44 and 45 have cam followers 48 and 49 mounted thereon to cooperate with cams 42 and 43. Switch 44 carries contacts 50 and 51 which are insulated from each other and which cooperate with stationary contacts 52 and 53 respectively. Switch 45 carries movable contacts 54 and 55 which are insulated from each other and which cooperate with stationary contacts 56 and 57 respectively.

A switch having a handle 58 and movable contacts 59 and 60 which cooperate respectively with stationary contacts 61 and 62 and 63 and 64 is disposed adjacent switches 44 and 45.

The operation of my device is as follows:—
The meter 10 to be tested is placed on the testing rack 12, this operation connects it in circuit with the standard meter 11 through connections diagrammatically illustrated. After a proper load is applied to the meter to be tested button 28 is pressed by the operator. This causes the device to become operative. Depression of button 28 opens contacts 29 and breaks the connection between coil 35 and source 26 so that coil 35 is deenergized. Depression of button 28 also closes contact 30 against contact 31 and thus bridges armature contact 20. Depression of button 28 also closes contact 31 against contact 32. These latter two contacts are held in contact by latch 33 and connect coil 25 across source 24 through contact armature 20.

During some part of a revolution of the disk 15 an opening allows the beam of light from light 13 to impinge upon photo-electric cell 16. Cell 16 allows a small current of three or four micro amperes to flow, which is then amplified by means of vacuum tubes 17 to a value suitable for the operation of the electro-magnetic relay generally indicated at 18. Relay 18 operates by the effect of coil 19 on the contact armature 20 which is in series with coil 25 through contacts 31 and 32 as already explained. Each impulse of coil 19 therefore causes armature 20 to close against its spring 200 and thereby causes a movement of ratchet 39 through coil 25, armature 36 and pawl 37. Movement of ratchet 39 causes movement of shaft 41 and of cams 42 and 43 mounted thereon.

The cam 42 or 43 which is to be used is selected by the switch controlled by handle 58 which is thrown to upper position if cam 42 is to be used and to lower position if cam 43 is to be used. Assuming the switch controlled by handle 58 to be in the position shown in Figure 1, cam 42 and consequently switch 44 are to be used. The initial impulse from cell 16 to coil 19 moves cam 42 so that follower 48 moves from a low point of cam 42 to an intermediate point so that switch 44 is in neutral position with contacts 50 and 51 out of contact with contacts 52 and 53. This permits a definite number of revolutions of disk 15, usually one half revolution, before contact 44 is closed to operate the standard meter 11. Successive operations of cell 16 and coil 19 energize coil 25 and rotate ratchet 39 and shaft 41 so that follower 48 rides onto a high point of cam 42 which causes contact 50 to engage contact 52 and thereby energize the potential circuit of the standard meter 11. This causes rotation of the standard meter 11 until cam 43 is moved such a distance that follower 48 falls from a high point to a low point of cam 42. In this position contact 51 engages contact 53 so that coil 35 is energized thereby attracting latch 33 and breaking the engagement of contacts 30 and 32 thus deenergizing coil 25 and stopping the device.

A similar series of operations may be performed by means of cam 43 by setting the switch controlled by coil 58 in the opposite position to that in which it is shown in Figure 1. In this position cam 43 actuates switch 45 to close the potential circuit of standard meter 11 when cam follower 49 is on a low position of cam 43 and to energize coil 35 when follower 49 is on a high point of cam 43. As pointed out above cams 42 and 43 are respectively designed with a suitable number of teeth for testing the meter 10 under full load and under light load.

The above apparatus is merely illustrative. I may, if desired, use any other convenient type of motor in place of that consisting of coil 25, armature 36, pawl 37 and ratchet 39. I may also, if desired, use a separate motor for each of the cams 42 and 43 instead of mounting both of these cams on the same shaft as I have shown. Moreover I may employ other means than cams 42 and 43 for intermittently actuating switches 44 and 45.

In Figure 5 I have illustrated alternate means for making a photo-electric cell responsive to a meter such as a watt hour meter. These means consist of a meter 10 having a disk 15 or other moving part and mounted on a rack 12. Secured to disk 15 or to any convenient moving part of the meter I provide one or more mirrors 70. A light and a photo-electric cell are located relative to each other and to mirror 70 so that the photo-electric cell receives impulses due to the reflection or interruption of a beam of light by the mirror on each revolution of the mirror.

In Figure 6 I have illustrated a moving part 115 of a meter with projections 116 thereon suitable for intermittently interrupting a beam of light for actuating a photo-electric cell.

In Figure 7 I have illustrated a moving part 215 of a meter with notches 216 therein to transmit intermittently a beam of light for actuating a photo-electric cell.

I do not intend to be limited in the practice of my invention save as the scope of the prior art and of the attached claim may require.

I claim:

An electric testing device including in combination a meter to be tested, a moving part for said meter, a testing rack for supporting said meter, a standard meter, electric circuit connections including said test rack between said meter to be tested and said standard meter, a light adjacent said meter to be tested, a photo-electric cell arranged so as to be exposed to and shielded from said light by said moving part of said meter to be tested, means for amplifying the currents generated by said light in said photo-electric cell, a motor operated in response to the amplified currents of said photo-electric cell, a switch for connecting said motor so as to be operated by said amplified currents of said photo-electric cell, means for holding said switch in position to render said motor operable by said currents, means for opening said switch after predetermined movement of said motor, a plurality of cams operated by said motor, a plurality of switches each operated by one of said cams and connected to start movement of said standard meter after predetermined movement of said motor and to stop movement of said standard meter after further predetermined movement of said motor, and a third switch for connecting one of said plurality of switches into circuit and for disconnecting the remainder of said plurality of switches.

FRED. STRATTNER.